United States Patent [19]

MacDougall et al.

[11] Patent Number: 4,622,905
[45] Date of Patent: Nov. 18, 1986

[54] FURNACING

[75] Inventors: John MacDougall, Pittsburgh; John K. Pargeter, Ellwood City, both of Pa.

[73] Assignee: International Metals Reclamation Co., Inc., Ellwood City, Pa.

[21] Appl. No.: 707,796

[22] Filed: Mar. 4, 1985

[51] Int. Cl.[4] .............................................. F23D 1/00
[52] U.S. Cl. ......................................... 110/347; 75/3; 75/33
[58] Field of Search .................. 110/347, 233; 75/3, 75/33, 45

[56] References Cited

U.S. PATENT DOCUMENTS

| | | | |
|---|---|---|---|
| 2,823,108 | 2/1958 | Gerlach | 75/33 |
| 3,443,931 | 5/1969 | Beggs et al. | 75/33 |
| 3,663,201 | 5/1972 | Heitmann | 75/33 |

Primary Examiner—Edward G. Favors
Attorney, Agent, or Firm—Francis J. Mulligan, Jr.; Raymond J. Kenny

[57] ABSTRACT

Discloses an improvement in furnacing objects on the top surface of an impervious rotating hearth in a directly fired rotary hearth furnace by the use of fuel burning with a luminous flame e.g., coal.

8 Claims, 2 Drawing Figures

FURNACING

The present invention is concerned with furnacing of agglomerated material and, more particularly, with furnacing agglomerated material containing a mixture of metal oxide and reductant carried on the upper surface of a moving, essentially impervious hearth.

PRIOR ART AND PROBLEM

It has been conceived that direct reduction of iron oxide and other metallic oxides can be carried out using pelletized or briquetted feed supported on the top surface of an impermeable moving hearth, e.g., a hearth in a rotary hearth furnace. In these direct reduction processes, the pellets or briquettes are raised rapidly to a temperature at which reduction will take place but at which essentially no liquid phases will be present in the treated material. U.S. Pat. Nos. 2,793,109, 3,443,931 and 3,922,165 disclose specific means of furnacing pelletized or briquetted material. Specifically in both U.S. Pat. Nos. 2,793,109 and 3,443,931 it is disclosed that moveable hearth furnaces suitable for thermally treating pellets containing iron oxide and reductant are heated directly by gaseous fueled flames generally directed so as to heat a upper refractory radiating surface e.g., radiating surface 21 of FIG. 3 of U.S. Pat. No. 2,793,109 and roof 38 of FIG. 1 of U.S. Pat. No. 3,443,931. U.S. Pat. No. 2,793,109 states that the radiating surface is heated to about 2000° F. (1366° K.) and U.S. Pat. No. 3,443,931 states that the roof temperature is about 1800°–2200° F. (1256°–1478° K.) in a first zone and about 2300°–2600° F. (1533°–1700° K.) in a second zone and is high enough to maintain the hearth at 2300°–2600° F. (1533°–1700° K.) in a third zone. According to the description in the Harker et al patent No. 3,922,165, tubular-shaped notched briquettes appear to be heated principally by conduction of heat from hot flue gases into the briquette structure. In each of the aforediscussed patents it is contemplated and specifically disclosed that the fuel used in the specifically disclosed furnace is a gaseous fuel.

In many locations in the world where direct reduction of metal e.g., iron oxide is a viable technology, fuel gas is a scarce and expensive commodity. On the other hand, coal is often locally available. It is an object of the present invention to provide a process in which coal or other solid carbonaceous material can be used, not only as a reductant for iron oxide but also as a fuel source.

DESCRIPTION OF THE INVENTION

Figure 1:
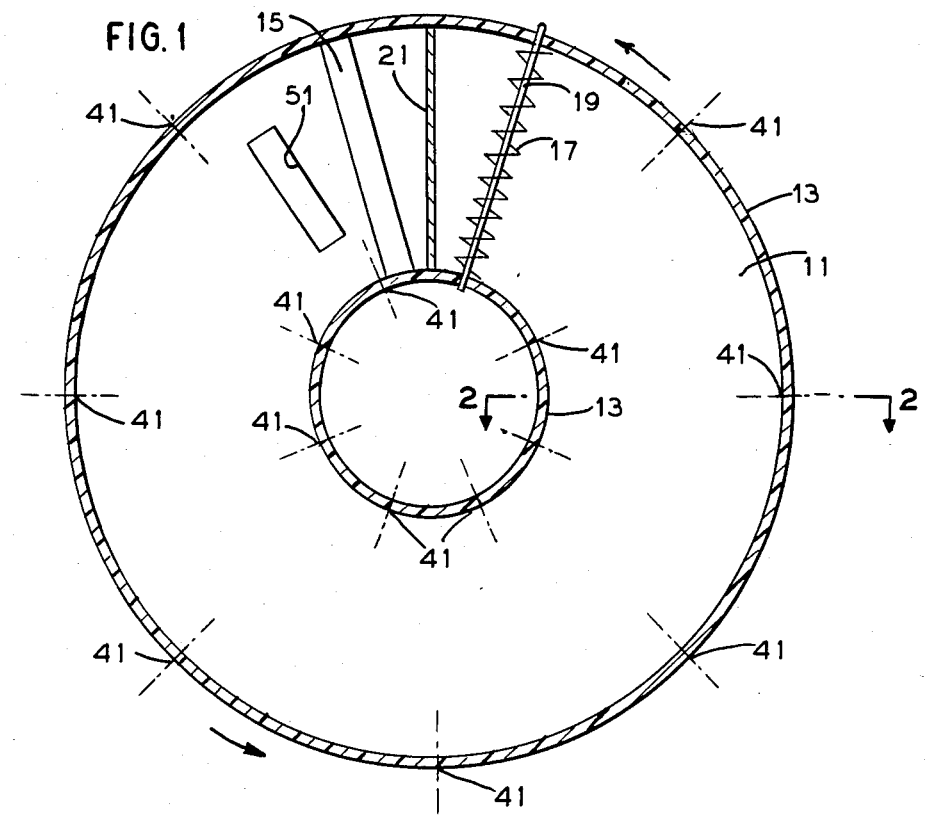
FIG. 1 is a schematic plan view of a rotary hearth furnace.
Figure 2:
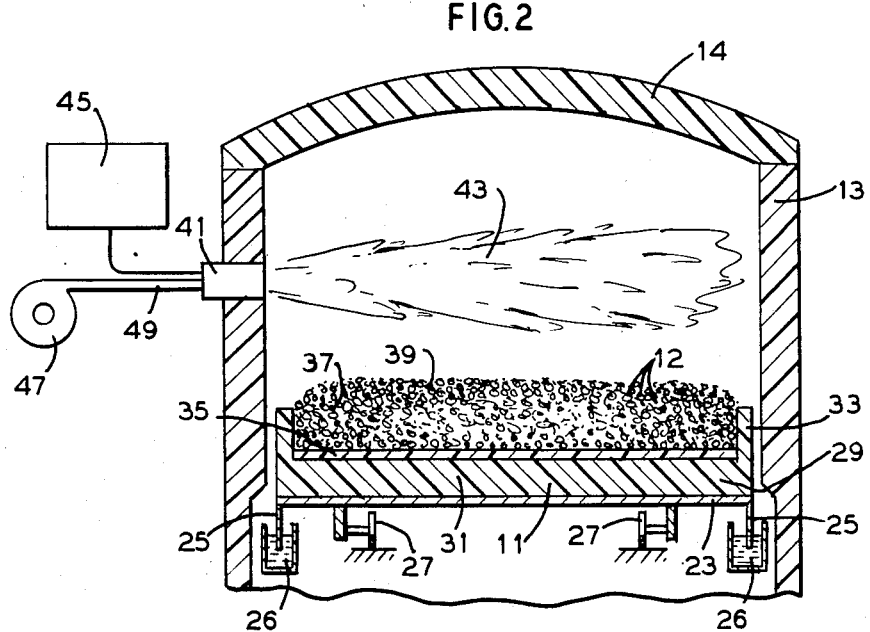
FIG. 2 is a cross-sectional view of the rotary hearth furnace of FIG. 1 at section 2—2.

The present invention contemplates a process for heating or furnacing agglomerates which contain both metal oxide and a reductant. This process involves supporting the agglomerates on the top surface of an impervious hearth moving in a directly heated enclosure countercurrently to product of combustion gases. The direct heating of the enclosure is provided by a multiplicity of burners employing, at least in part, a powdered solid carbonaceous fuel which produce a multiplicity of hot, luminous flames when operated at or near a stoichiometric combustion ratio with oxygen-containing gas, e.g., air. The multiplicity of luminous flames generally spaced along the path travelled by the agglomerates on the moving hearth act as a primary source of radiant heat for heating the agglomerates and produce product of combustion gases of sufficient velocity to pneumatically carry ash out of the enclosure so as to avoid significant ash contamination of the agglomerates.

Agglomerates used in the process of the present invention are advantageously pellets produced from wetted fines in a pelletizing drum or on a pelletizing disc. For practical purposes, roughly spherical pellets so produced can be about 1 to about 3 cm. in diameter. Alternatively other shapes of agglomerates can also be used, for example, brick shapes, cut up extruded forms, and the tubular shapes as disclosed in the Harket et al patent as disclosed hereinbefore.

Metal oxides which can be reduced are principally of the iron group, i.e., iron, cobalt and nickel oxides. These oxides and the metals themselves have a high melting temperature and are readily reduced using carbonaceous reductants. Preferably the reductant for these oxides is finely divided coal or coke used in an amount somewhat in excess of the stoichiometric amount required for reduction. Particularly when iron oxide is being reduced in the process of the present invention, it is advantageous to design the agglomerate mix to provide roughly 4% excess carbon which will remain in the furnaced agglomerate after metallization (reduction) in complete. This excess carbon prevents reoxidation of the metallic iron by the furnace atmosphere prior to agglomerate discharge and by oxidation of the metallic iron by oxidants in contact with the agglomerate subsequent to discharge and prior to cooling below about 100° C. It is to be understood that substances other than coal or coke in agglomerates may also contribute to reduction. For example, organic waste products where available cheaply (e.g., paper mill wastes) can be used as agglomerate binders. Such organic waste products can cause reduction of metal oxide and, when used, should be considered in determining the amount of carbonaceous reductant in the agglomerate mix. Likewise some agglomerates may employ petroleum oils or residues as binders or as reductants and the reducing effect of these materials should also be considered when formulating metal oxide-reductant agglomerates useful in the process of the present invention.

The moving impervious hearth which supports agglomerates in accordance with the invention is advantageously a rotary hearth operating in a rotary hearth furnace enclosure. The word "impervious" is employed in describing such hearths to exclude porous supports through which gas is drawn and forced. When such porous hearths are used, heat transfer to agglomerates is principally by way of conduction from contact between the hot gas and the agglomerate. While such hearths are operable, they present considerable practical problems and the required gas heating and moving means, e.g., heat exchangers, fans, etc. are very expensive. Furthermore, the gas passing through a bed of agglomerate and a porous hearth must be reasonably free of particulate matter because the hearth and the agglomerate bed will act much like a filter to capture a large part of ash, cinders, burning particulates, etc. in a gas passing through.

In producing a multiplicity of high emissivity luminous flames in the enclosure surrounding the moving, impermeable hearth, it is an essential feature of the invention to employ as at least part of the fuel a powdered solid fuel such as coke or coal. In order to maintain a maximum flame temperature in excess of about 1920° K. using air as the combustion gas, the fuel employed should have a heat or combustion in excess of about 20 MJ/kg on a dry basis. Using this criterion, operable particulate carbonaceous fuels, employed alone can include coke, coke-by-product coal, anthracite coal, bituminous low volume coal, bituminous high volume A coal, bituminous high volume B coal, sub-bituminous A coal and sub-bituminous B coal. Of course, if oxygen or oxygen enriched air is employed as the combusting gas even poorer grades of coal can be used as the sole fuel. In addition, fuel mixtures such as gas, natural or synthetic, or oil and particulate carbonaceous fuel can be used to provide both high flame emissivity and the required heat of combustion. Still further liquid fuels having a high carbon to hydrogen ratio, e.g., a weight ratio of carbon to hydrogen of greater than about 11 to 1 can also be used to provide flames of high emissivity.

The effective operation of the process of the present invention is primarily dependant upon the provision of hot flames e.g., flames having a maximum temperature in excess of about 1920° K., of high emissivity. The basic mechanism for heating of a bed of agglomerates supported on a moving, impermeable hearth is radiation. As is well known, the total radiant emittance $W_b$ of a black body is:

$$W_b = \partial T^4 W/m^2$$

where $\partial$ is the Stefan-Boltzman constant of $5.7 \times 10^{-8}$ $W/m^2 \cdot T^4$ with T expressed in degrees Kelvin. The use of luminous flames as the primary source of radiant energy provides radiant sources at a temperature of at least 1920° K. which have the theoretical capacity to produce about 1.6 times the total radiant emittance of a surface of a temperature of 1700° K. assuming equal radiating area. In addition, a powder coal flame comprises, first, a pneumatic flow of glowing particles ranging in character from particles having a carbon surface to burnt out particles having a surface of ash composition and secondly a non-gray band radiating gas phase including carbon monoxide, carbon dioxide, water vapor and products intermediate coal and the ultimate combustion products. While a detailed scientific analysis of the coal flame emittance has not been made (and is really impossible because of the varying nature of coal) it is believed that one half the total surface area of particulates at any given instance in a coal flame is in excess of the radiating area of prior art furnace structures as discussed hereinbefore. It is also believed that the average spectral emissivity of the particulates exceeds the emissivity of ordinary refractory radiating surfaces. This belief is founded on the premises that a carbon surface is a more effective radiator of thermal energy at high temperatures than an oxidic refractory and that oxidic ash is a radiator of thermal energy approximately equal in effectiveness to an oxidic refractory. As to the contribution of non-gray gas band radiation to the total radiant emittance of luminous coal flames, it is believed that this contribution will not differ significantly from the non-gray gas band radiation of any hydrocarbon fueled flame. Regardless of the exact nature of the radiating mechanisms of a luminous powder coal flame, it has been found in operating a rotary hearth furnace that by using powder coal flames produced by small burners spaced around the hearth path producing flames having directions parallel to the plane of the moving hearth, lower total fuel is used for furnace operation compared to the fuel use when natural gas is burned in similarly spaced and aimed burners.

It has also been found that the efficiency of reduction of the iron ore or nickel ore is increased with the use of luminous powder coal flame. For instance the degree of reduction (total oxygen removal) is greater when using luminous powder coal flames than when using flames produced by burning natural gas when fuel inputs (basied on heating value of the fuels) were used.

SPECIFIC DESCRIPTION OF INVENTION

The process of the present invention is specifically described in relation to the drawing. Referring now thereto, rotary hearth 11 rotates counterclockwise within inner and outer enclosures 13 made of refractory material having refractory roof 14 supported thereon and by structural support means not depicted. Pellets 12 made of a mixture of iron oxide and coal powder are placed on hearth 11 at about location 15 by means not depicted projecting downwardly through roof 14. Reduced pellets 12 comprising essentially metallic iron and containing about 4% by weight carbon are removed from hearth 11 at point 17 by means of water-cooled screw 19. A fixed barrier 21 separates points 15 and 17. Hearth 11 generally consists of metal support plate 23 carrying skirts 25 which project into water-filled troughs 26. Plate 23 rides on wheels 27 or equivalent means and is driven by a conventional means not depicted. Hearth 11 further comprises inpervious refractory trough 29 made up refractory bottom mass 31, refractory side walls 33 an insulating layer 35 and granular refractory 37 which comprises top 39 of impervious rotary hearth 11. Pellets 12 ride on hearth top 39 and during treatment transform from green oxide-reductant mix pellets to metallized pellets containing a small excess of carbon.

The furnace, bounded by hearth 11, enclosing walls 13 and roof 14 is heated by a plurality burners 41 producing a plurality of flames 43 spaced around the path of rotation of hearth 11. Burners 41 are fed from powdered coal source 45 employing conventional means to convey coal of a size such that 90% passes a 74 micrometer screen to burner 41. Likewise air as combustion gas is fed to burners 41 by blower 47 and line 49. Those skilled in the art will appreciate that line 49 may be manifolded to supply a plurality of all of burners 41 or all or part of the combustion air can be used to transport the powdered coal. It is important that radiant energy sources, e.g., flames and radiating refractory surfaces be present even near point 15, the start of travel of agglomerates on hearth 11. Relatively little heat is transferred to agglomerates on an impervious hearth by convection-conduction. Thus if no radiant heat sources are present at the start of travel of agglomerates, they will not heat significantly until exposed to a radiant heat source at a point remote from the point of introduction onto hearth 11.

Flames 43 are positioned essentially parallel to the plane of hearth 11 and spaced apart therefrom. Gas resulting from combustion of coal in flames 43 along with gases resulting from the dehydration of and reduction of oxide in pellets 12 travels countercurrently to the direction rotation of hearth 11 and exits through flue 51 in roof 14. It is important for product purity especially when high ash coal is used as fuel that the gases exiting through flue 51 have a velocity between enclosures 13 at the bottom of flue 51 of at least 1.0 meters/second. This is the minimum speed which will guarantee that ash and cinder components will not contaminate product pellets 12. It is even more advantageous to maintain the exit speed of gases beneath flue 51 at a minimum of about 5.0 meters/second.

Typical temperatures encountered in the process of the present invention are pellet temperatures increasing from loading temperature, usually about 100° C. or less using less heat than used in producing the same product when natural gas is the fuel.

Because of the varied nature of descriptions of coal around the world, Table II has been adapted from Kirk-Othmer, Encyclopedia of Chemical Technology Third Edition and sets forth names or numbers and characteristics of various kinds of coals useful as fuel and reductant in the process of the present invention as they are known in certain countries and in an international classification system.

TABLE II

| Classes of the international system | | | Classes of national systems | | | | | | |
|---|---|---|---|---|---|---|---|---|---|
| | Parameters | | | | | | | | |
| Class no. | Volatile matter, % | Calorific value (calulated to standard moisture content), MJ/kg | Belgium | Germany | France | Italy | Netherlands | Poland | United Kingdom | United States |
| 0 | 0–3 | | | | | antraciti speciali | | meta-antracyt | | meta-anthracite |
| 1A | 3–6.5 | | maigre | Anthrazit | anthracite | antraciti communi | anthraciet | antracyt | anthracite | anthracite |
| 1B | 6.5–10 | | | | | | | polantracyt | | |
| 2 | 10–14 | | ¼ gras | Mager-kohle | maigre | carboni magri | mager | chudy | dry steam | semianthracite |
| 3 | 14–20 | | ½ gras ¾ gras | Esskohle | demigras | carboni semi-grassi | esskool | polkoksowy metako-ksowy | coking steam | low-volatile bituminous |
| 4 | 20–28 | | | Fettkohle | gras a courte flamme | carboni grassi corta fiamma | vetkool | ortoko-ksowy | medium-volatile coking | medium-volatile bituminous |
| 5 | 28–33 | | gras | Gaskohle | gras propre-ment dit | carboni grassi media fiamma | | gazowo koksowy | | high-volatile bituminous A |
| 6 | 33 (33–40) | 32.4–35.4 | | | | carboni da gas | gaskool | | | |
| 7 | 33 (32–44) | 30.1–32.4 | | | flambant gras | carboni grassi da vapore | gasvlam-kool | gazowy | high-volatile | high-volatile bituminous B |
| 8 | 33 (34–46) | 25.6–30.1 | | Gas flamm-kohle | flambant sec | carboni secchi | vlamkool | gazowo-plomienny | | high-volatile bituminous C |
| 9 | 33 (36–48) | 25.6 | | | | | | plomienny | | Subbituminous | at point 15 to about 1100° C. after 180° of travel and then gradually increasing to about 1320° C. near point 17. The temperature of roof 14 average about 1260° C. and the maximum flame temperature is about 1650° C. to about 1820° C.

Table 1 sets forth data concerning comparative fuel consumption as between natural gas non-luminous flame operation and luminous coal flame (supplemented with natural gas) operation of a commercial size rotary hearth furnace for reduction of iron-oxide-containing pellets, the furnace being modified only to the extent necessary for adaptation to the particular fuel.

TABLE I

| | Natural Gas | Coal + Natural Gas | |
|---|---|---|---|
| Fuel Consumed (Kg/Kg product) | 0.33 | 0.39 | 0.077 |
| Heat Content of Fuel MJ/Kg | 55.5 | 31.4 | 55.5 |
| Heat Consumed (MJ/Kg product) | 18.37 | 12.34 | 4.31 |
| | | | 16.65 (Total) |

The data in the foregoing table shows that through the use of a luminous coal flame, product can be produced using less heat than used in producing the same product when natural gas is the fuel.

While the present invention has been described and illustrated with respect to specific embodiments and special features, those skilled in the art will appreciate that modification and alteration of these features and embodiments can be made and that certain features can be employed in the absence of others or in conjunction with improvements and other modifications.

We claim:

1. A process of furnacing agglomerates containing both metal oxide and reductant comprising positioning said agglomerates on the upper surface of a substantially impervious hearth causing said hearth to move in an enclosure beneath and countercurrently to the direction of movement of product of combustion gases, employing as at least part of the fuel source for said product of combustion gases a powdered solid fuel selected from the group of coke, anthracite coal, bituminus coal and sub-bituminous and combusting said fuel source approximately stoichiometrically with an oxygen-containing gas to provide (A) a plurality of luminous flames at a maximum flame temperature in excess of about 1920° K. in said enclosure whereby said luminous flames are a primary source of radiant energy for direct heating of said agglomerats and (B) product of combustion gases deficient in free oxygen and having a velocity sufficient to pneumatically carry ash out of said enclosure.

2. A process as in claim 1 wherein said agglomerates are pellets.

3. A process as in claim 2 wherein said pellets contain at least one oxide from the group iron oxide, nickel oxide and cobalt oxide.

4. A process as in claim 1 wherein the sole fuel is a coal having a heat of combustion on a dry basis of at least about 20 MJ/kg.

5. A process as in claim 1 wherein the reductant and the fuel is a powdered coal having a heat of combustion on a dry basis of at least about 20 MJ/kg.

6. A process as in claim 1 wherein said oxygen-containing gas is air.

7. A process as in claim 1 wherein said hearth is the hearth of a rotary hearth furnace.

8. A process as in claim 2 wherein product of combustion gases along with gases resulting dehydration and reduction of oxide in pellets have a velocity of at least 1.0 meters/second as they exit the hearth enclosure.

* * * * *